(12) United States Patent
Albright

(10) Patent No.: US 6,896,157 B1
(45) Date of Patent: May 24, 2005

(54) DEVICE FOR DISPENSING FLUIDS AND RECOVERING FLUID RUNOFF

(76) Inventor: Trevor Ryan Albright, 1139 Nixon Ave., NW., Grand Rapids, MI (US) 49544

( * ) Notice: Subject to any disclaimer, the term of this patent is extended or adjusted under 35 U.S.C. 154(b) by 5 days.

(21) Appl. No.: 10/791,553

(22) Filed: Mar. 2, 2004

(51) Int. Cl.⁷ ................................................ B67D 5/44
(52) U.S. Cl. ....................... 222/109; 222/318; 222/382
(58) Field of Search ................................ 222/109, 318, 222/382, 189.11, 424

(56) References Cited

U.S. PATENT DOCUMENTS 5,992,480 A * 11/1999 Hussain ........................ 222/109
2003/0197023 A1 * 10/2003 Chuen ........................... 222/109

* cited by examiner

Primary Examiner—Philippe Derakshani

(57) ABSTRACT

Disclosed is a device for dispensing fluids such as hand soaps. The device provides a recovery bin that captures run off or dripping fluid thus reducing or substantially eliminating waste of the fluid.

7 Claims, 1 Drawing Sheet

DEVICE FOR DISPENSING FLUIDS AND RECOVERING FLUID RUNOFF

FIELD OF THE INVENTION

The present invention relates to the dispensing of fluid from a container. More specifically, the present invention relates to the reduction or elimination of waste that can occur when fluids are dispensed from a container into human hands.

BACKGROUND OF THE INVENTION

A myriad of devices exist for dispensing fluids such as hand soaps into the hands of a user. The present invention primarily relates to those types of dispensers found in public restrooms. Typically, these devices consist of some type of a fluid reservoir that is connected to a fluid transporting means (e.g., a plastic tube) which is in turn connected to a hand operated pump. A user typically places one hand under the pump's fluid dispensing point and operates the pump with the other hand. The pump dispenses fluid (e.g., soap) into the user's hand.

A single human hand is not an ideal receptacle for receiving a fluid. Unless the fluid is very viscous a portion of the fluid will likely run off the user's hand. This run off fluid is wasted and creates unsightly drippings that must be cleaned by janitorial staff.

Similarly, many hand operated pumps do not operate perfectly and dispense fluids at angles that miss the awaiting hand or fail to precisely cut off the fluid thereby creating drips which must be cleaned by janitorial staff.

Slick spots on floors and unsightly pools of soap and lotion are common occurrences in many public bathrooms and represent a double form of waste: a waste of the original fluid and a waste of time and resources in cleaning up the resulting mess. Accordingly, there is a need for device that will reduce or substantially eliminate the amount of fluid that is dispensed from these devices but is wasted due to lack of care on the part of the user or malfunctions on the part of the pump that dispenses the fluid.

OBJECT AND SUMMARY OF THE INVENTION

It is an object of the invention to provide a device that device that effectively and efficiently dispenses fluids such as soaps.

It is a further object of the invention to provide a device that reduces or substantially eliminates the unwanted drippings and losses associated with existing fluid dispensing devices.

It is a still further object of the invention to provide a device that recovers and recycles fluids that may run off of a user's hands or are otherwise rendered waste because they were diverted from an intended receptacle.

SUMMARY OF THE INVENTION

The above and other objects of the invention are met by the claimed fluid dispensing device. The claimed fluid dispensing device consists essentially of.

DETAILED DESCRIPTION

Figures 1, 2:
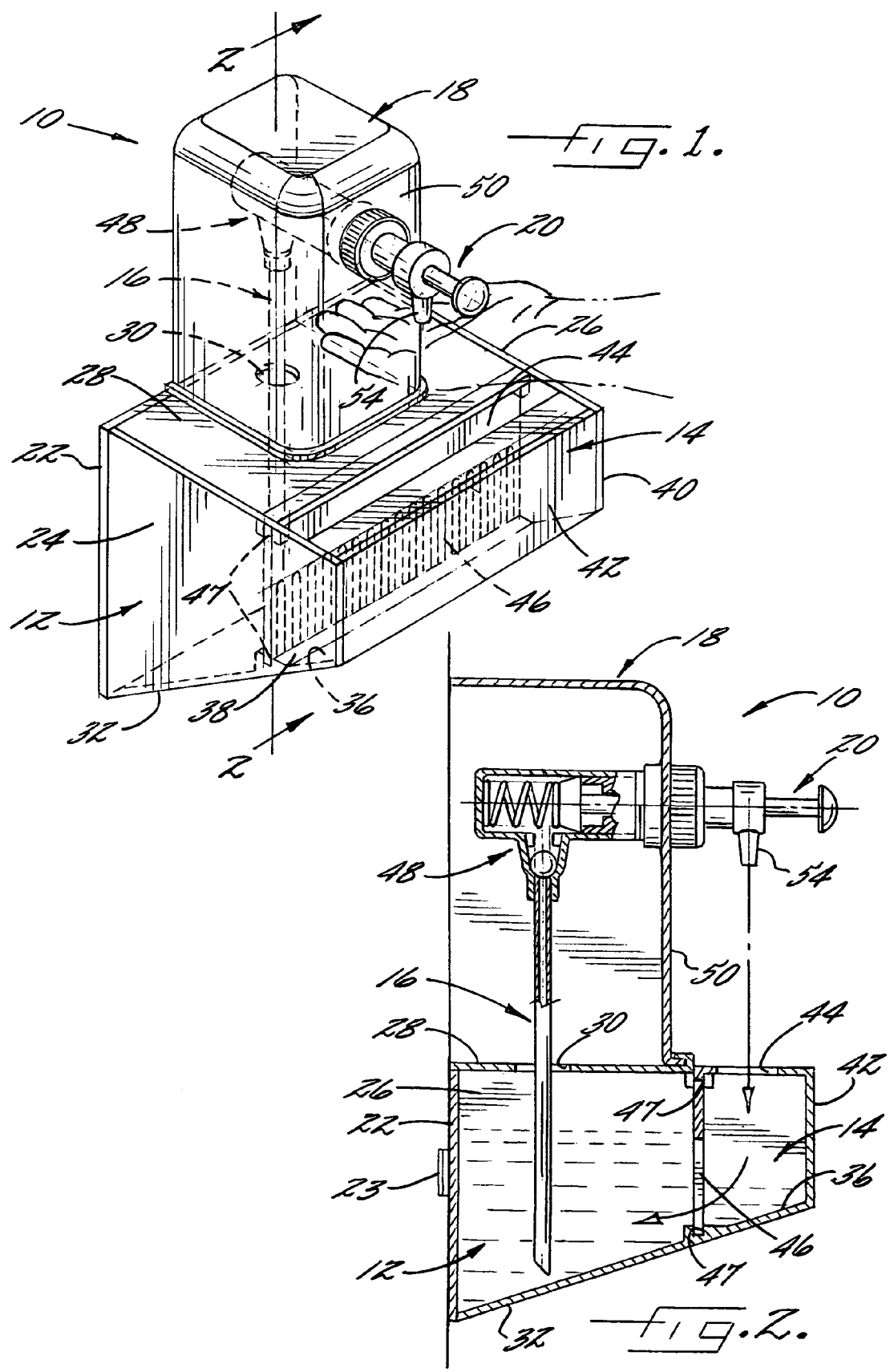
FIG. 1 is a perspective view of the device according to the invention.
FIG. 2 is a vertical section taken substantially along the line 2—2 in FIG. 1.

The following narrative is presented in the context of describing a soap dispenser for a public restroom. This contextual framework, however, is used as an aid to the reader and should not be used as limiting the scope of the invention. Those skilled in the art will readily recognize that the invention may be utilized with many fluids in a variety of applications.

In very general terms, the invention is a device that circulates hand soap from a fluid reservoir to a discharge point where some of the soap is used and some is lost or wasted as run off. The run off is collected in a recovery bin where it is channeled back to the fluid reservoir. Preferably, the soap is filtered as it travels from the recovery bin to the fluid reservoir. The device according to the invention will now be described in more detail.

Turning now to the drawings, the device (10) according to the invention is shown. The device (10) comprises a fluid reservoir (12), a fluid recovery bin (14), a fluid transport means (16), a means for securing (18) the fluid transport means (16), and a hand operated pump (20).

The fluid reservoir (12) is defined by a rear wall (22). In most applications attaching means (23) such as brackets or screws will attach rear wall (22) to the wall of a structure such as a bathroom wall. Alternatively, the device (10) according to the invention may be free standing and supported by a stand. Such a stand is not critical to the function of the invention and will not be discussed in detail given that the construction thereof is well within the knowledge of one skilled in the art.

The shape of the rear wall (22) is preferably rectangular but can be altered to other polygonal shapes depending upon the ultimate end use and esthetic considerations. Referring to the FIG. 1 depiction of a rectangular rear wall (22), the rear wall (22) connects a first side wall (24) and a second side wall (26). The first and second side walls (24), (26) are opposed and parallel to one another and are mechanically connected to the rear wall (22).

The term mechanically connected, as used herein, is defined to include any means of mechanically attaching two members. Such means include, but are not limited to, adhesives, screws, pins, rivets, friction joints, tongue and groove joints, soldering, welding, melting followed by pressure, and snap joints. To the extent elements of the claimed invention are formed from polymeric materials, the term mechanically connected also includes co-extrusion where a long sheet of polymer is extruded and the various recited walls and surfaces represent formed portions of the same polymer sheet. To the extent the elements of the claimed invention are formed from metals, the term mechanically connected also includes metal forming activities where the various recited walls and surfaces represent machined portions of one metal sheet.

Also connected to the rear wall (22) and the first and second side walls (24), (26) is a top panel (28) as shown in FIG. 1. The top panel (28) contains a hole (30) located in the interior of the top panel (28) intermediate the fluid reservoir first and second side walls (24), (26). The top panel (28) is also in mechanical connection with the rear wall (22) and the fluid reservoir first and second side walls (24), (26).

The fluid reservoir (12) is also defined by a bottom panel (32). The fluid reservoir bottom panel (32) is mechanically connected to the fluid reservoir rear wall (22) and the fluid reservoir first and second side walls (24), (26). The bottom panel (32) also forms an acute angle with the rear wall (22) thereby creating an incline toward the base of the rear wall (22).

As shown in the figures, the mechanical connection of the fluid reservoir rear wall (22), the fluid reservoir bottom panel (32), and the fluid reservoir first and second side walls (24), (26) creates a gravity fed enclosure that can collect and retain fluids that contact the bottom panel (32).

Adjacent the fluid reservoir (12) is a recovery bin (14). The recovery bin (14) is defined by a recovery bin bottom panel (36) that is abutting and coplanar and mechanically connected with the fluid reservoir bottom panel (32). In preferred embodiments, the recovery bin bottom panel (36) and the fluid reservoir bottom panel (32) are made from a single piece of polymer or metallic sheeting.

The recovery bin (14) further comprises a recovery bin first side wall (38) and a recovery bin second side wall (40). The recovery bin first side wall (38) is abutting and coplanar and mechanically connected with the fluid reservoir first side wall (24). The recovery bin second side wall (40) is abutting and coplanar and mechanically connected with the fluid reservoir second side wall (26). In preferred embodiments, the recovery bin side walls are and the fluid reservoir side walls are made from a single piece of polymer or metallic sheeting.

The recovery bin (14) further comprises a front wall (42). The recovery bin front wall (42) abuts and is mechanically connected to the recovery bin bottom panel (36).

As shown in FIG. 1, the top panel (28) does not extend all the way to the recovery bin front wall (42) thus defining an opening (44) above the recovery bin bottom panel (36).

In preferred embodiments a filtering means (46) is located intermediate the recovery bin front wall (42) and the fluid reservoir rear wall (22). The filtering means (46) functionally operates to separate the recovery bin (14) from the fluid reservoir (12). The purpose of the filtering means (46) is to catch contaminates that may fall into the opening (44) and prevent them from entering the fluid reservoir (12).

The filtering means may be of any design that allows for fluid communication between the recovery bin (14) and the fluid reservoir (12). The filtering means (46) may be as selective as desired. In preferred embodiments, however, the filtering means (46) is sized to catch contaminates that are approximately an eighth of an inch or larger such as rings. The filtering means (46) may be made from a polymer or a metal.

In preferred embodiments, the filtering means (46) is removable from the claimed device (10). This may be accomplished by providing grooves or channels (47) in the side or bottom walls that may receive the filtering means. Other means of removably attaching the filtering means are known to those skilled in the art and are within the scope of the claimed invention.

The device according to the invention also comprises a fluid transport means (16) and a valve system (48). The term fluid transport means (16) includes any of the known devices used to transport fluid in known fluid dispensing systems such as public restroom soap dispensers. Typically such devices are made of some type of polymer tube which may or may not have a filter on the end of the tube that comes into contact with the fluid. Alternatively, the fluid transport means (16) could be made of metal tubing. The fluid transport means (16) is of sufficient length to extend from a typical valve system (48) located above the fluid reservoir top panel (28), through the fluid reservoir top panel hole (30) an into the fluid reservoir (12) to a depth sufficient to come into contact with fluid held therein.

The device according to the invention also possesses a securing means (18) for securing the fluid transport, valve, and pumps system and maintaining their spatial relationship with the fluid reservoir (12). In the exemplary device shown in FIG. 1 the securing means (18) is a rectangular housing (50) situated above the top panel hole (30). The housing (50) serves the function of anchoring the fluid transport (16) and valve means (48) which may be attached to the housing (50) in any conventionally known method (e.g., threaded fasteners, adhesives, friction, etc.). The housing (50) need not be identical to the housing shown in FIG. 1 but should serve the function of stabilizing the fluid transport means (16) and preferably serves the dual purpose of being a place of attachment between the fluid transport means (16) and a hand operated pump (20).

Preferably a hand operated pump (20) such as those commonly found on existing fluid dispensing devices is attached to the fluid transport means (16) at the valve system (48). The hand operated pump (20), fluid transport means (16), and the valve system (48) should be situated such that the fluid dispensing point (54) of the hand operated pump (20) is above the opening (44) of the recovery bin (14) and intermediate the top panel (28) and the recovery bin front wall (42).

The utility of the claimed device is readily apparent in that by providing a recovery bin underneath the pump's dispensing point, any runoff from a user's hands or delayed drippings can be caught by the bin, drain from the bin through the filter and into the fluid reservoir (as indicated by the arrows in FIG. 2) for reuse thus reducing or eliminating significant waste.

That which is claimed is:

1. A device for dispensing fluids and recovering fluid runoff, the device comprising of:
   a fluid reservoir, said reservoir defined by
      a rear wall,
      a first side wall,
      a second side wall opposite said first side wall,
      a top panel, said top panel having a hole and being in mechanical connection with said rear wall and said first and second side walls, and
      a bottom panel, said bottom panel in mechanical connection with said rear wall and said first and second side walls and forming an acute angle with said rear wall;
   a recovery bin adjacent said fluid reservoir, said recovery bin having
      a bottom panel that is abutting and coplanar with said fluid reservoir bottom panel,
      a first side wall abutting and coplanar with said first side wall of said fluid reservoir,
      a second side wall abutting and coplanar with said second side wall of said fluid reservoir,
      a front wall abutting said recovery bin bottom panel and said recovery bin side walls, and
      an opening defined by said recovery bin front wall and said fluid reservoir top panel;
   filtering means intermediate said fluid reservoir rear wall and said recovery bin front wall, said filtering means allowing fluid communication between said fluid reservoir and said recovery bin;

a fluid transport means extending through said fluid reservoir top panel hole into said fluid reservoir;

securing means for securing said fluid transport means;

a hand operated pump connected to said fluid transport means, said hand operated pump having a fluid dispensing point that is above said opening of said recovery bin and intermediate said fluid reservoir top panel and said recovery bin front wall.

2. A device according to claim 1 wherein at least one of said rear wall, top panel, bottom panel, and side walls is made of a polymer.

3. A device according to claim 2 wherein said fluid reservoir bottom panel and said recovery portion bottom panel are a continuous piece of plastic.

4. A device according to claim 1 wherein at least one of said rear wall, top panel, bottom panel, and side walls is made of metal.

5. A device according to claim 1 further comprising opposing retaining means proximate the points where said recovery portion side walls join said fluid reservoir portion side walls.

6. A device according to claim 5 wherein said retaining means are channels for slidably receiving said filtering means.

7. A device according to claim 1 wherein said filtering means is a polymeric grate.

* * * * *